US007525267B2

(12) United States Patent
Angiuli et al.

(10) Patent No.: US 7,525,267 B2
(45) Date of Patent: *Apr. 28, 2009

(54) BARRIER OPERATOR CONTROLLER WITH OPTICAL LIMIT SWITCHES

(75) Inventors: Ralph C. Angiuli, Canfield, OH (US); Michael T. McMahon, Salem, OH (US); Brett A. Reed, Alliance, OH (US)

(73) Assignee: Overhead Door Corporation, Farmers Branch, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/054,922

(22) Filed: Mar. 25, 2008

(65) Prior Publication Data

US 2008/0168711 A1 Jul. 17, 2008

Related U.S. Application Data

(63) Continuation of application No. 10/989,479, filed on Nov. 16, 2004, now Pat. No. 7,355,363.

(51) Int. Cl.
*H02P 1/00* (2006.01)

(52) U.S. Cl. ........................ 318/282; 318/286; 318/466; 318/468; 49/26; 49/28

(58) Field of Classification Search ................. 318/280, 318/283, 286, 466, 468; 49/26, 28
See application file for complete search history.

(56) References Cited

U.S. PATENT DOCUMENTS

| | | | | |
|---|---|---|---|---|
| 5,428,923 | A * | 7/1995 | Waggamon | 49/28 |
| 5,684,372 | A * | 11/1997 | Fitzgibbon et al. | 318/280 |
| 5,929,580 | A * | 7/1999 | Mullet et al. | 318/466 |
| 6,118,243 | A * | 9/2000 | Reed et al. | 318/468 |
| 6,388,412 | B1 * | 5/2002 | Reed et al. | 318/466 |
| 6,566,828 | B2 * | 5/2003 | Fitzgibbon et al. | 318/283 |

* cited by examiner

*Primary Examiner*—Rina I Duda
(74) *Attorney, Agent, or Firm*—Gardere Wynne Sewell LLP

(57) ABSTRACT

An operator for a barrier, such as an upward acting door, includes a control unit having two optical limit switches providing output signals to a controller to effect shut-off of the operator motor when the door reaches open and closed limit positions. The limit switches preferably include LED emitter and phototransistor sensor elements and are preferably mounted on a circuit board in close proximity to a screw member which rotates in timed relation to the position of the door. Linearly movable nut members are mounted on the screw member and include or engage optical shield members which move into positions to provide respective output signals from the optical switches. The door closed optical limit switch may incorporate a pre-limit switch function to override a signal from a door bottom edge obstruction sensor.

12 Claims, 8 Drawing Sheets

BARRIER OPERATOR CONTROLLER WITH OPTICAL LIMIT SWITCHES

CROSS REFERENCE TO RELATED APPLICATION

This application is a continuation of co-pending application Ser. No. 10/989,479, filed Nov. 16, 2004.

BACKGROUND OF THE INVENTION

Motorized garage door operators and the like have been developed of a type which utilize mechanical limit switches for controlling the operator motor when the door reaches open and closed limit positions, respectively. Typical door operators with mechanical snap-action type switches have been developed wherein the switches are mounted on a frame of the operator and in proximity to a rotating threaded shaft with one or more linearly traveling nut-like members mounted thereon which engage and actuate the limit switches when the door is traveling between open and closed positions. At least two mechanical type switches are generally required, a first switch for effecting control of the operator motor to shut off when the door reaches a full down or closed position and a second switch to effect motor shut off when the door reaches a full up or open position. Typically, in prior art operators, the first switch is provided with multiple sets of electrical contacts or a third mechanical limit switch is used to sense the door position just prior to the fully closed condition to disable obstruction sensing devices mounted on the lower edge of the door to prevent such devices from reversing door movement just prior to the door reaching its fully closed position.

Although mechanical limit switches are widely used they hold certain disadvantages, including lack of reliability, physical size and the need to provide hardwiring to and from the switches. However, in accordance with the present invention the disadvantages of mechanical limit switches are overcome by providing a door operator controller including so called optical limit switches.

SUMMARY OF THE INVENTION

The present invention provides a door operator which includes improved limit switches of the so called optical or opto interrupter type for providing signals to an operator controller to indicate the open and closed limits of door position. The present invention also provides a door operator controller having a circuit board which is mounted in such a way that opto interrupter type door limit switches can be mounted directly on the circuit board and in proximity to a mechanism for effecting operation of the limit switches when the door reaches opposed limit positions.

In accordance with one aspect of the present invention, a door operator controller includes at least two optical type limit switches which are each operable to sense the position of a traveling member, such as a nut mounted on a threaded shaft whereby the shaft is positively coupled to mechanism for controlling the movement and position of a barrier, such as a door. An improved traveling nut adjustment feature is part of the present invention. Moreover, the invention contemplates the provision of an optical shield member which moves with the traveling nut in one embodiment and a shield member which is engaged by a traveling nut member just prior to reaching a limit position in another embodiment.

In accordance with another aspect of the present invention, a door operator is provided with optical limit switches mounted on a printed circuit board disposed in proximity to a mechanism which correlates the position of a garage door or the like with the opto interrupter limit switches so that the door may be controlled to stop at full open and closed positions.

In accordance with still another aspect of the invention, a door operator controller is provided with a micro-controller and circuit with two spaced apart opto interrupter type optical limit switches. The operating characteristics of the limit switches are such that signals from the opto interrupter circuitry may be used as a prelimit switch to prevent reversal of movement of the door once the door has reached a substantially closed position, for example.

In accordance with yet another aspect of the present invention, a door operator is provided which includes a controller having a temperature sensor for monitoring the ambient temperature and for providing a signal which is used to compensate for changes in sensitivity of optical limit switches due to changes in ambient temperature.

Those skilled in the art will recognize the above described advantages and superior features of the invention together with other important aspects thereof upon reading the detailed description which follows in conjunction with the drawings.

Figure 6:
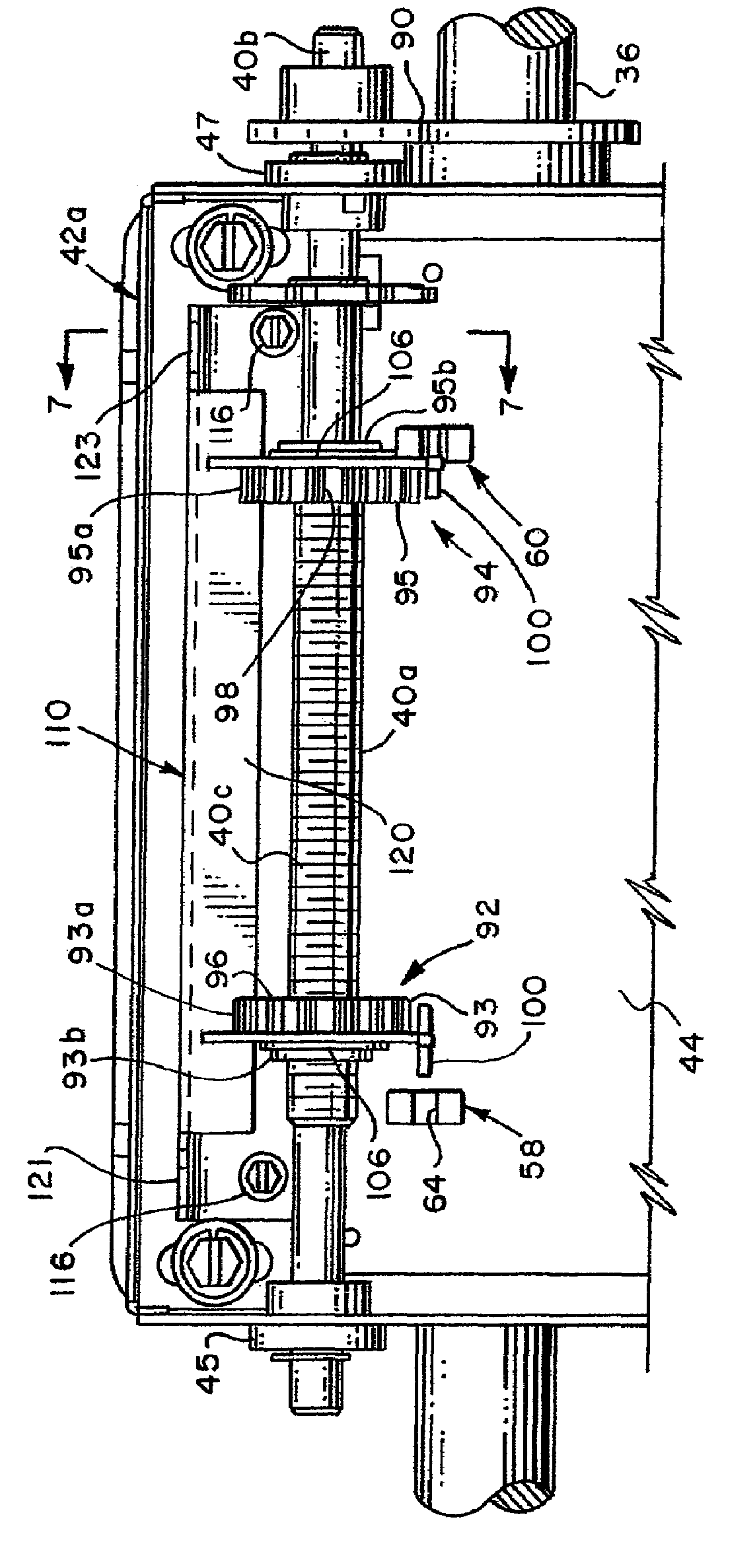
FIG. 6 is a side elevation of another preferred embodiment of the present invention showing a rotatable screw shaft and traveling nut mechanism.
Figure 7A:
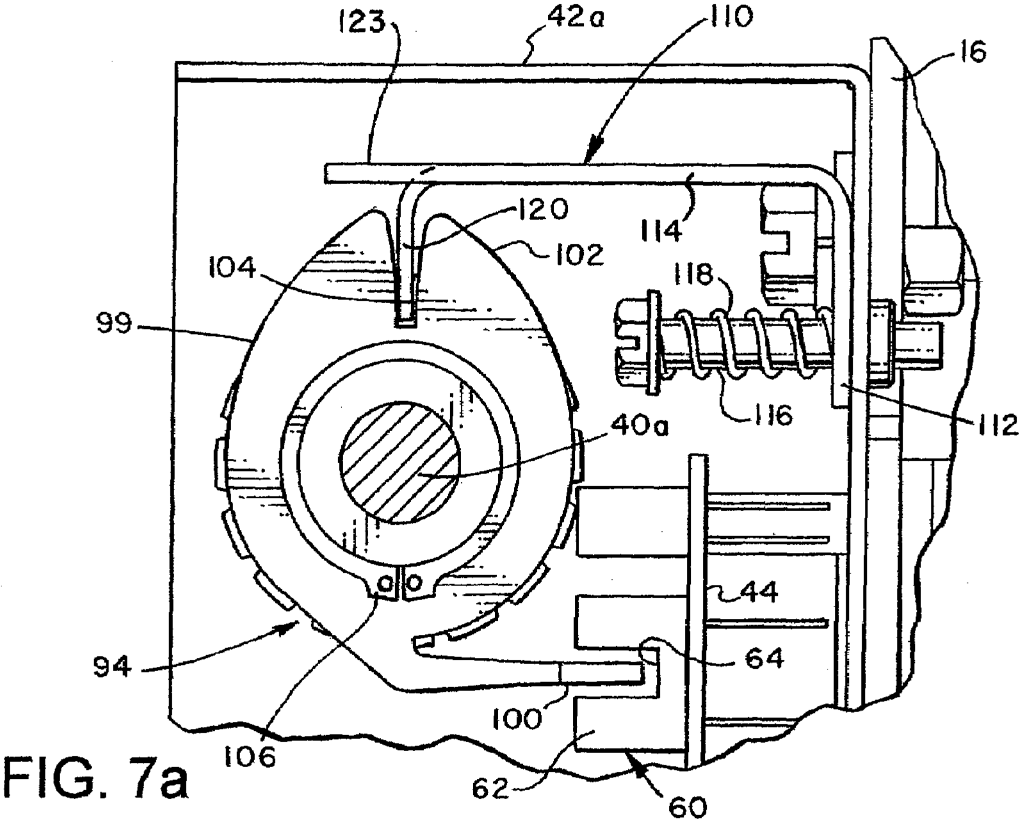
Figure 7B:
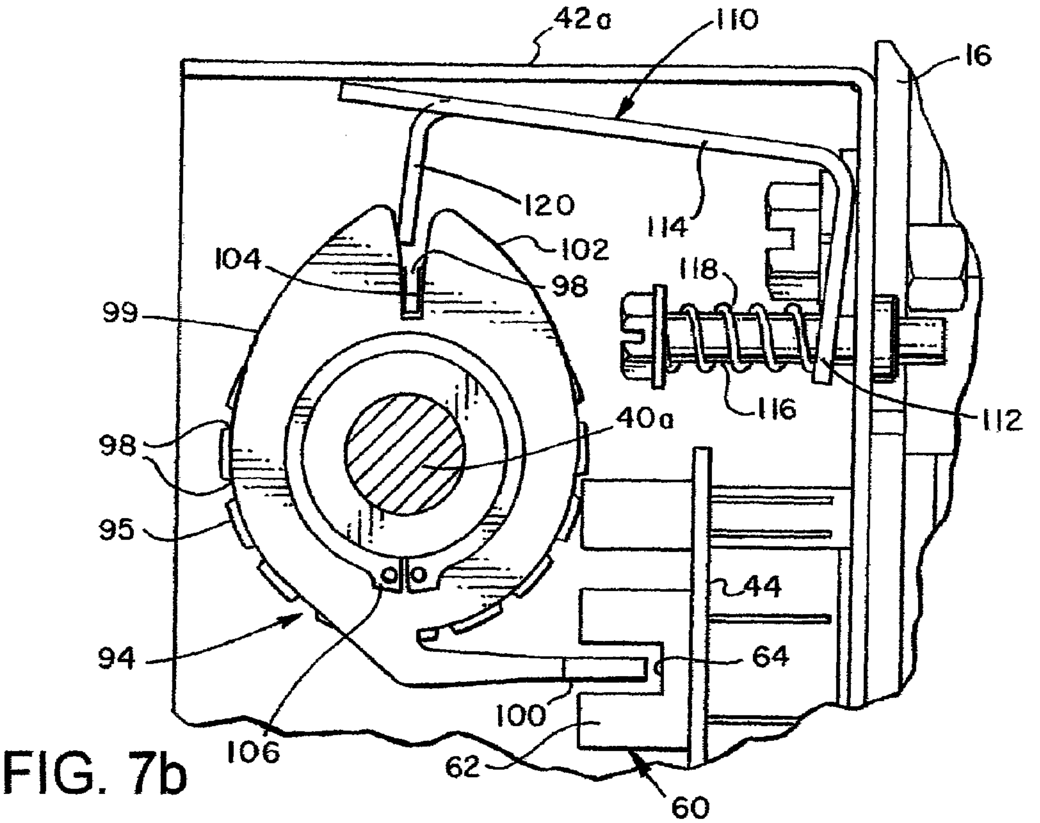
Figure 8:
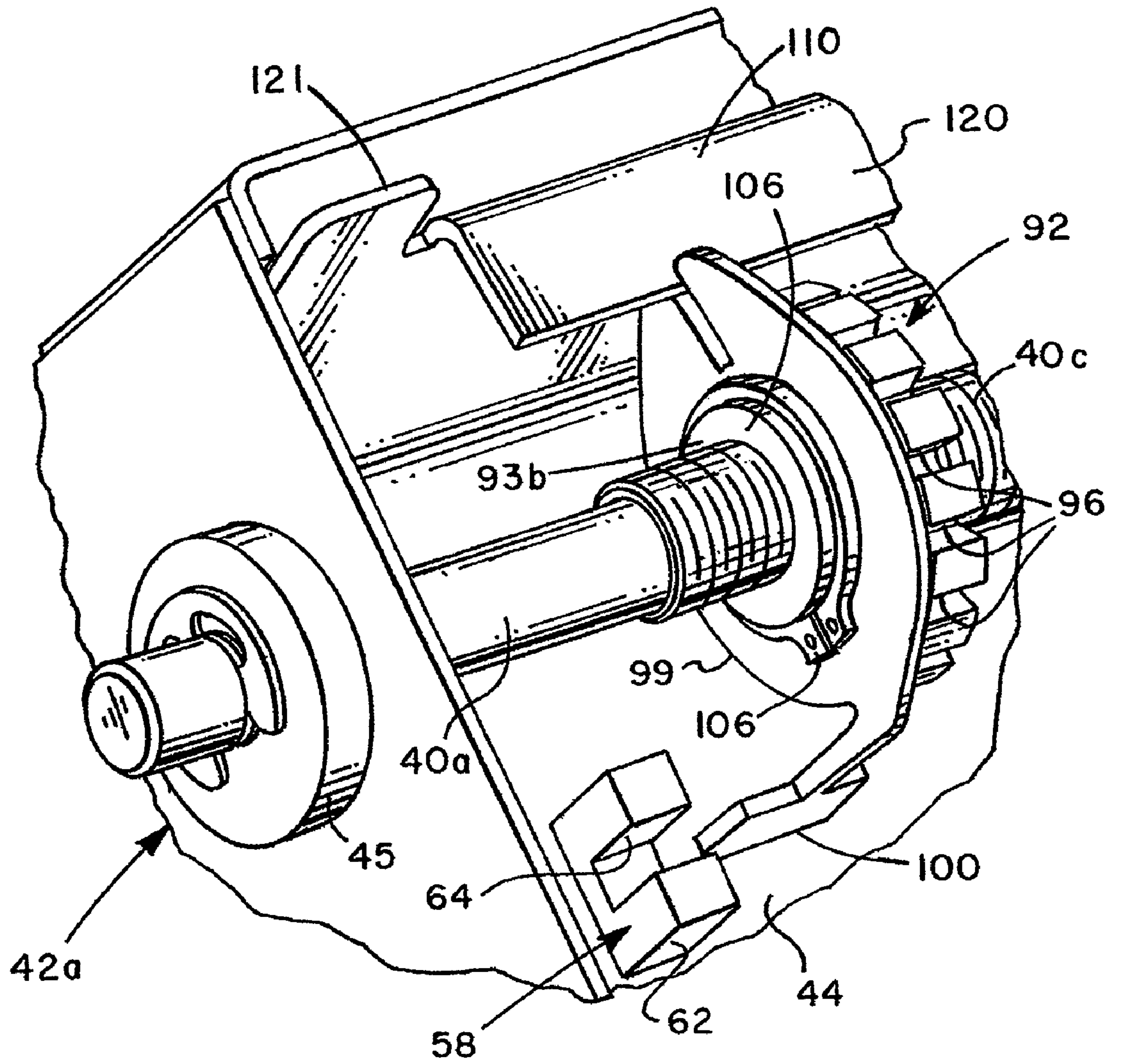
Figure 9:
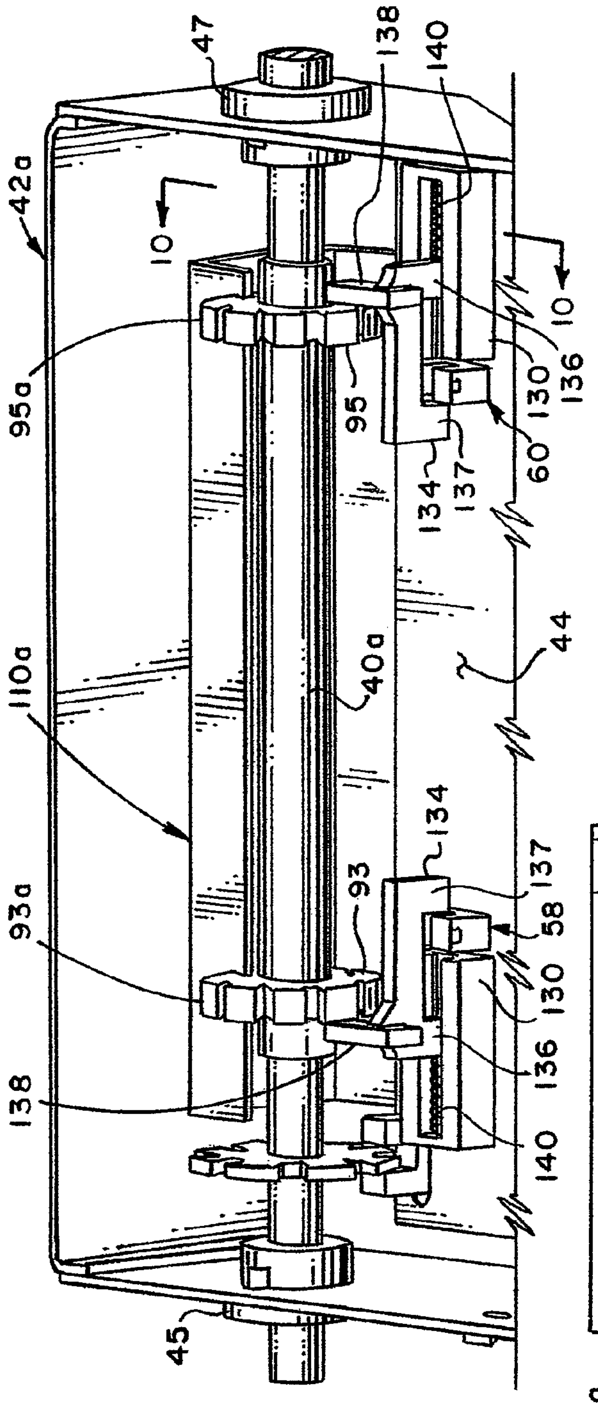
Figure 10:
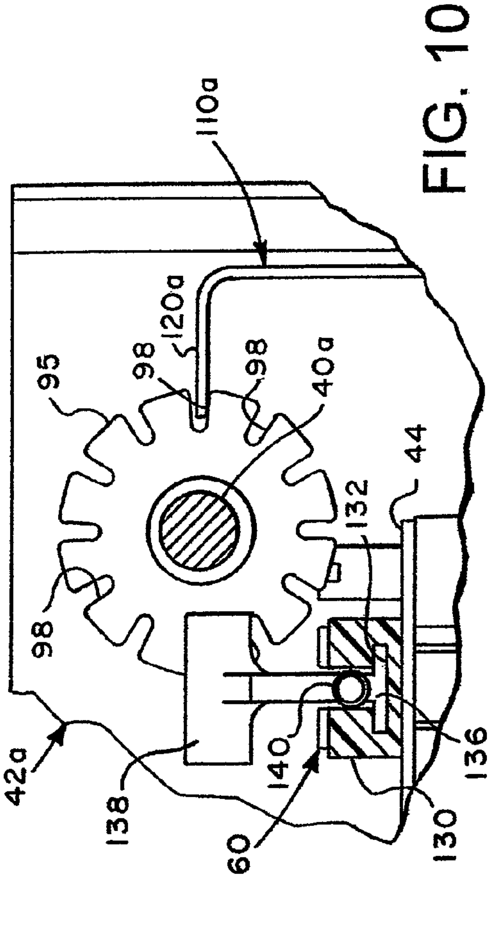

FIGS. **7*a* and 7*b* are views taken generally from the line 7-7 of FIG. 6**;

FIG. 8 is a detail perspective view of one of the traveling nut and optical shield assemblies for the embodiment shown in FIGS. 6 through 8;

FIG. 9 is a detail perspective view of still another preferred embodiment of a control unit with optical limit switches in accordance with the invention; and FIG. 10 is a view taken generally from the line 10-10 of FIG. 9.

DETAILED DESCRIPTION OF THE PREFERRED EMBODIMENTS

In the description which follows, like parts are marked throughout the specification and drawing with the same reference numerals, respectively. The drawing figures are not necessarily to scale and certain features may be shown in somewhat generalized or schematic form in the interest of clarity and conciseness.

Figure 1:
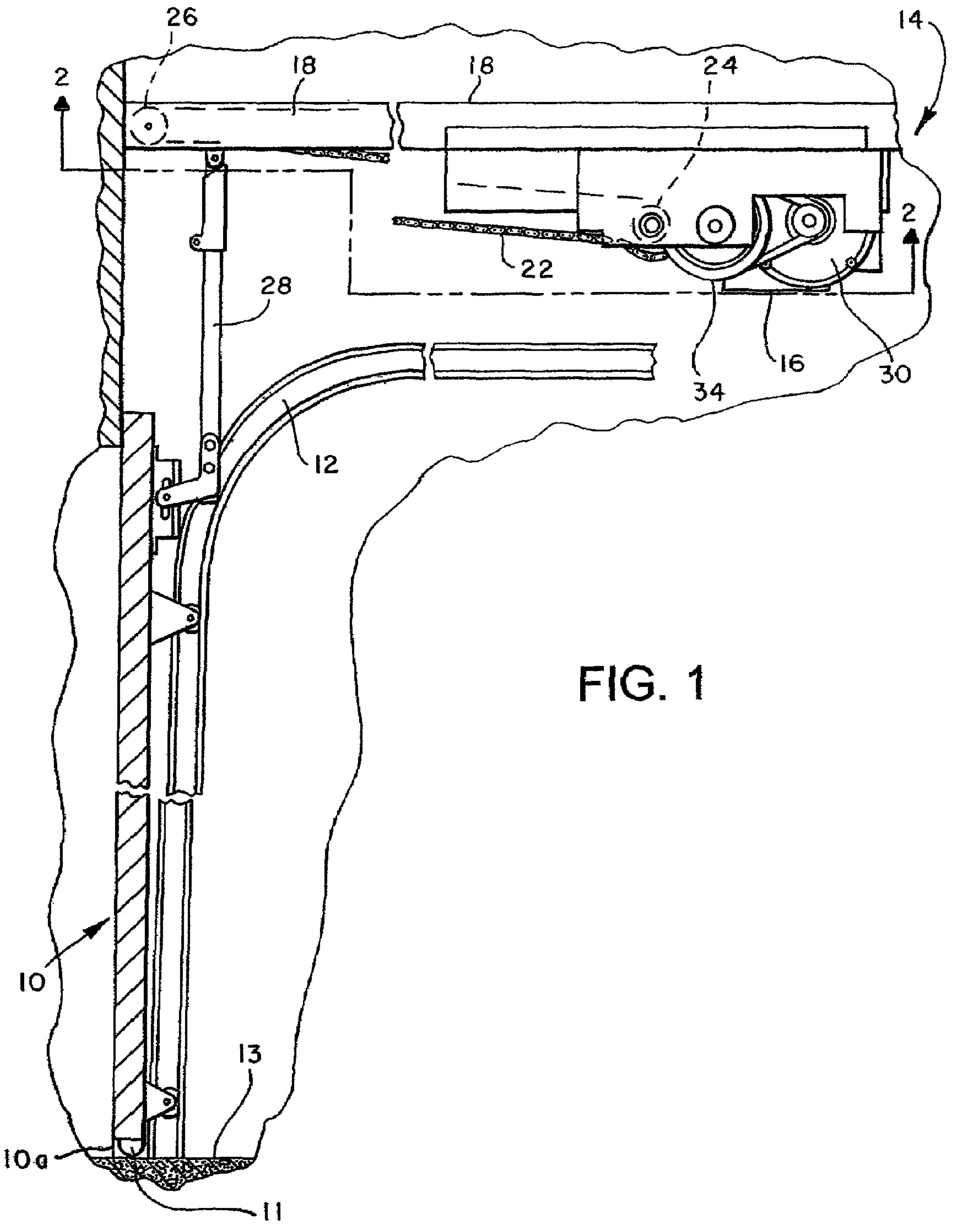
FIG. 1 is a side elevation of an upward acting door and door operator which includes the control system and optical limit switches in accordance with the present invention.
Figure 2:
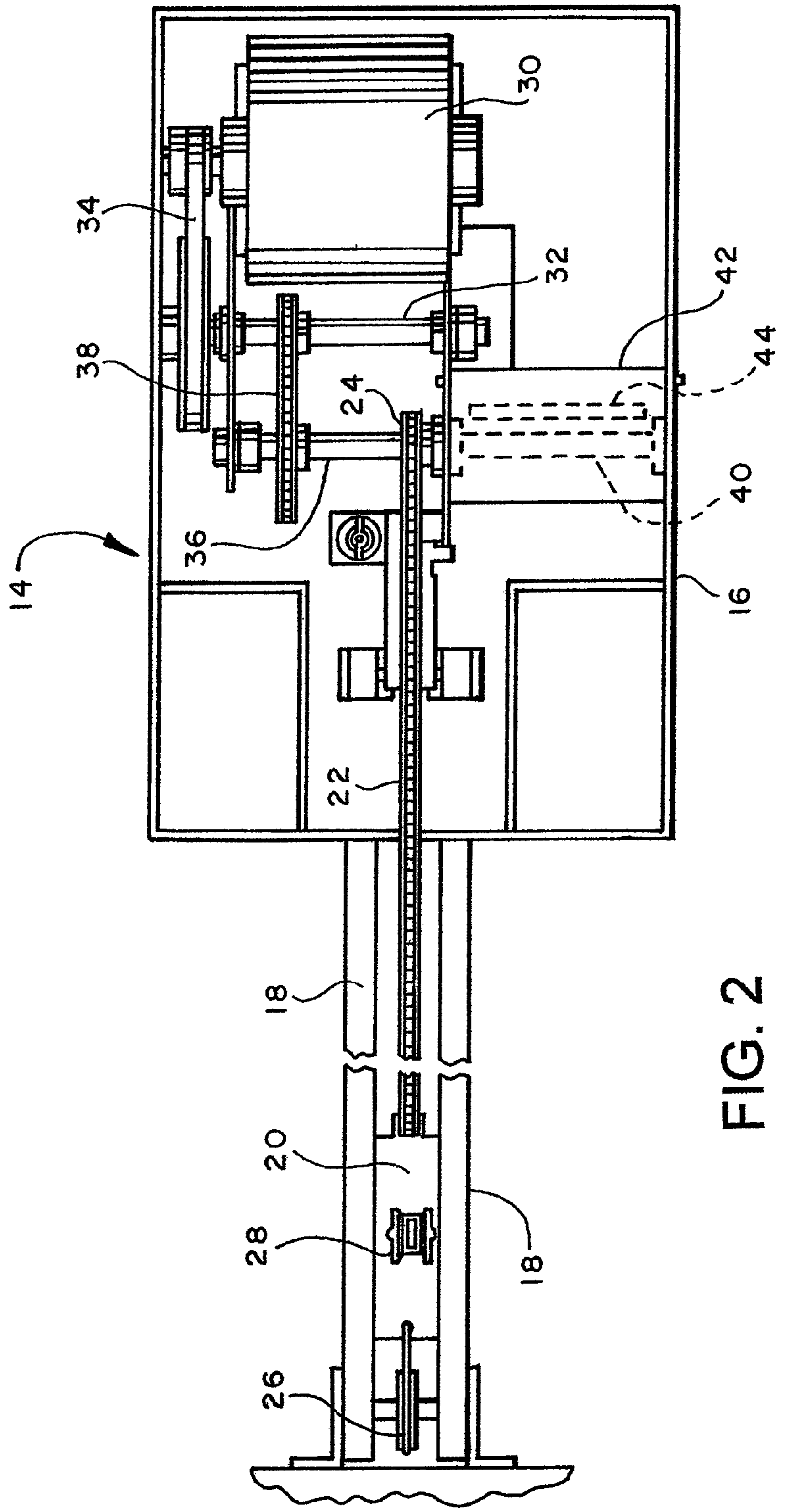
FIG. 2 is a view taken generally from the line 2-2 of FIG. 1.

Referring to FIGS. 1 and 2, there is illustrated a movable barrier comprising an upward acting door 10 which may be one of several types known to those skilled in the art and adapted to be moved between open and closed positions on spaced apart parallel guide tracks 12, one shown in FIG. 1.

The door 10 is adapted to be moved between open and closed positions by a motorized operator 14 which includes a frame 16 suitably mountable on support structure, not shown, and connected to an elongated rail 18 adapted to support a slide member 20, FIG. 2. The slide member 20 is connected to a suitable drive member, such as a chain 22, trained around a first sprocket 24 mounted on the frame 16 and at least a second sprocket 26 mounted on rail 18, as illustrated. Slide member 20 is connected to the door 10 by way of a suitable link 28 in a conventional manner.

Operator 14 includes a reversible electric motor 30 driveably connected to the sprocket 24 by way of an idler shaft 32, FIG. 2, and an endless belt 34. Idler shaft 32 is connected to a drive shaft 36 by way of an endless chain drive 38. Sprocket 24 is drivenly mounted on shaft 36. Motor 30, shaft 32 and shaft 36 may be mounted on frame 16 in a conventional manner. As shown in FIG. 2, shaft 36 includes an extension part 40 suitably mounted within a housing or enclosure 42 for a control system or control unit for the operator 14. Shaft extension 40 is also mounted in proximity to a printed circuit board 44 in an advantageous manner as will be described further herein. A control unit or system 43, see FIG. 5, for the motor 30, including the circuit board 44 and shaft extension 40, is operable to control operation of the motor 30 to move the door 10 between open and closed positions. As shown in FIG. 1, the transverse bottom edge 10*a* of door 10 may be provided with a so-called obstruction sensor 11, which is operable to detect an obstruction in the path of the door 10, particularly as it is moved from an open position toward a closed position whereby the obstruction sensor 11 will at least lightly contact floor 13, FIG. 1, just prior to the motor 30 being shut off to cease movement of the door, again in a manner known to those skilled in the art.

Figure 3:
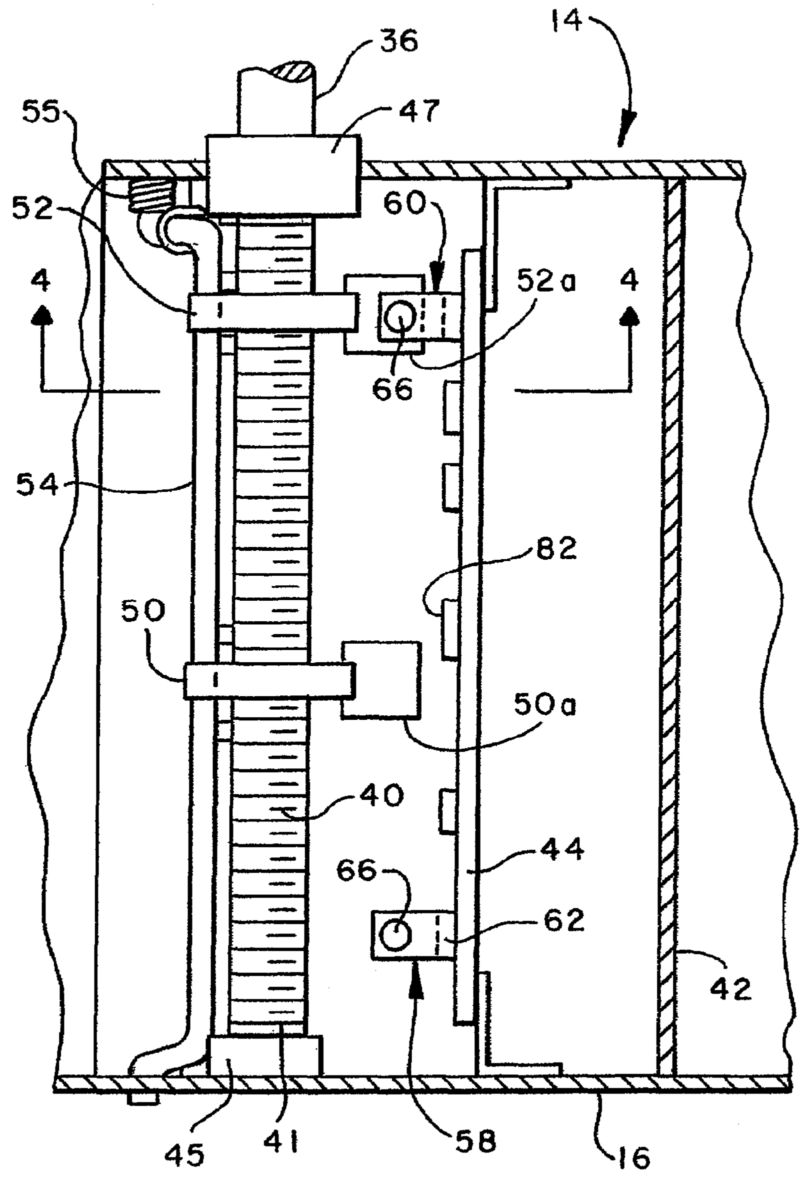
FIG. 3 is a detail view showing one preferred embodiment of a rotating screw shaft and traveling nut mechanism and illustrating circuit board mounted optical limit switches in accordance with the invention.
Figure 4:
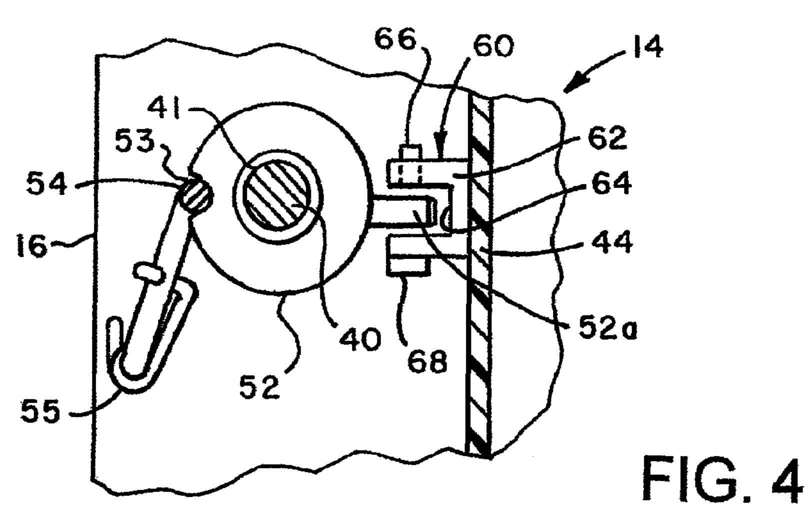
FIG. 4 is a view taken generally from the line 4-4 of FIG. 3.

Referring now to FIGS. 3 and 4, the shaft extension 40 is configured as a threaded screw-like member having suitable threads 41 formed thereon. Rotatable screw member 40 is suitably mounted in spaced apart bearings 45 and 47 supported on frame 16 in a conventional manner. Those skilled in the art will recognize that shaft extension or screw member 40 may be arranged differently than that described herein. Shaft extension 40 may, for example, be mounted separate from the drive train comprising the idler shaft 32, belt 34, chain drive 38, and drive shaft 36 of the particular arrangement described. Shaft extension 40, may for example, be mounted on frame 16 and separately rotatably driven by a suitable drive mechanism directly or indirectly connected to motor 30 or to the mechanism which moves door 10 between open and closed positions, as will be appreciated by those skilled in the art.

Referring further to FIGS. 3 and 4, shaft extension or screw member 40 is rotatable in bearings 45 and 47 and is adapted to support cooperating threaded nut members 50 and 52 which are mounted on screw member 40 for linear translation therealong, but are prevented from rotating by a spring biased elongated bar type lock member 54 which is engageable with both of the traveling nut members 50 and 52 to prevent rotation thereof in a known manner. As shown in FIG. 4, nut member 52 is provided with at least one radially outwardly facing slot 53 which is operable to register with lock member 54 to prevent rotation of nut member 52 but allow linear translation thereof. Lock member 54 is suitably mounted for pivotal movement on frame 16 and is engaged with a torsion spring 55 which yieldably biases the lock member 54 into slot 53 on nut member 52 and a corresponding slot on nut member 50. Lock member 54 may be moved out of engagement with the respective nut members 50 and 52 by grasping the lock member and moving it in a counter-clockwise direction, viewing FIG. 4.

Nut members 50 and 52 support opaque plate-like optical shield members 50*a* and 52*a*, respectively. Shield members 50*a* and 52*a* project radially from the axis of screw member 40 and when the nut members 50 and 52 are locked against rotation by the lock member 54, the shield members are aligned with respective optical switches 58 and 60 as shown in FIGS. 3 and 4. Optical switches 58 and 60 are advantageously mounted on circuit board 44 which is supported on frame 16 in proximity to the rotatable screw member 40. As shown by way of example in FIG. 4, optical switch 60 includes a suitable channel shaped support member 62 forming a slot 64 through which shield member 52*a* may traverse linearly as it moves along screw member 40. Support member 62 is adapted to support a suitable emitter 66 and sensor 68 which will be described in further detail herein. In like manner, optical switch 58 includes a channel shaped support member 62 also including respective emitter and sensor members 66 and 68, see FIG. 5, also.

Rotatable screw member 40 rotates in timed relation to the position of door 10 and thus, the positions of nut members 50 and 52 are also in accordance with the position of the door. In this way, as known to those skilled in the art, the nut members 50 and 52 may be located on screw member 40 in predetermined positions such that, for example, when the door reaches a full open position, nut member 50 and shield 50*a* will move into a position between the emitter 66 and sensor 68 of optical switch 58 to provide a signal which may be used to shut-off operation of the motor 30. In like manner, when the drive mechanism for the operator 14 is rotating in the opposite direction, nut member 52 will travel linearly along screw member 40 as shaft 36 and screw member 40 rotate, and the nut member 52 may be placed in a predetermined position on screw-member 40 such that, as the door 10 reaches a door closed position, the shield 52*a* will move into a position between the emitter 66 and sensor 68 of optical switch 60 to completely block transmission of radiation from emitter 66 to sensor 68 to provide a signal which will effect shut-off of motor 30 and arrest movement of the door 10 in a suitable door closed position.

Figure 5:
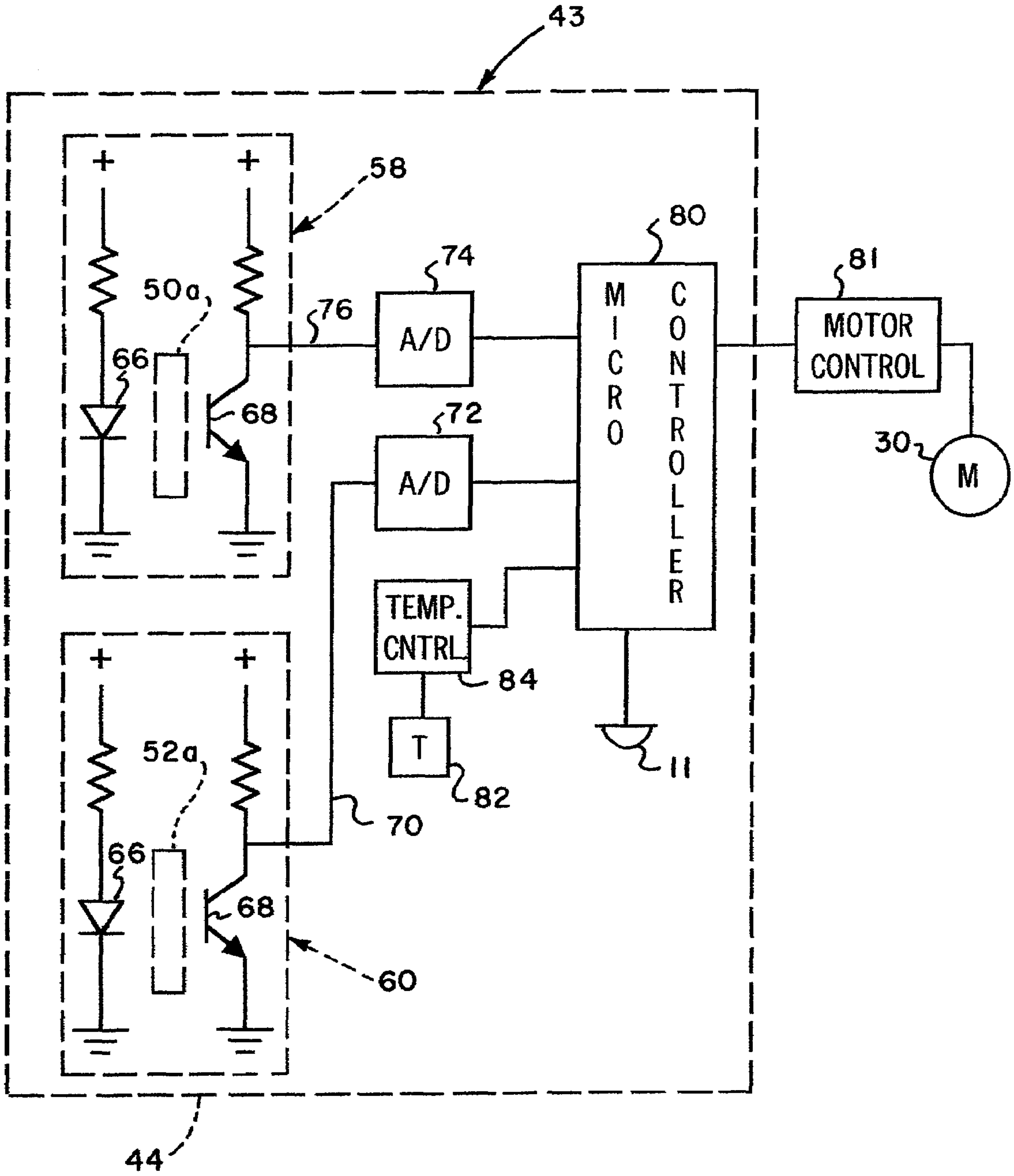
FIG. 5 is a schematic diagram of a door operator control unit including optical limit switches in accordance with the invention.

Referring now to FIG. 5, the optical switches 58 and 60 are shown in further schematic detail and are characterized in one preferred embodiment, respectively, by a light emitting diode (LED) type emitter 66 and a phototransistor type sensor 68. The emitters 66 are provided with a suitable electrical signal to direct a beam of electromagnetic energy toward the sensors 68, respectively. When the shields 50*a* and 52*a* move into a position, respectively, to block the transmission of electromagnetic energy from the respective emitters 66, the voltage output signal by the phototransistor type sensors 68 changes. For example, when the shield 52*a* is not in a position to block signal emission from the emitter 66 toward the sensor 68 of switch 60, the phototransistor type sensor turns "on" and a low voltage signal is detected on circuit 70, including a suitable analog-to-digital converter circuit 72. However, when shield 52*a* blocks light emitted from the LED 66 toward the phototransistor 68 of switch 60 the voltage output signal from the phototransistor becomes higher as imposed on the converter 72. Optical switch 58, of course, operates in the same manner and imposes a variable voltage signal on its analog-to-digital converter 74 by way of a conductor or circuit 76.

Output signals from the converters 72 and 74 are transmitted to a micro-controller 80 which is also adapted to receive a suitable electrical signal from the obstruction or bottom edge sensor 11 and from a temperature sensor 82 by way of a suitable control circuit 84. Temperature sensor 82 is suitably mounted on circuit board 44, preferably, as shown in FIG. 3, and is thus, in relatively close proximity to the optical switches 58 and 60. In this way, since optical switches 58 and 60 are somewhat temperature sensitive, the sensitivity of these switches may be compensated for by a temperature signal transmitted to micro-controller 80 and, via internal programming of the micro-controller, operation of the optical switches 58 and 60 is adjusted for changes in ambient temperature in the vicinity of the control unit 43. Signals from the temperature sensor 82 and the bottom edge or obstruction sensor 11 may also be presented to micro-controller 80 in digital form directly or by way of suitable converter circuits.

Substantial numbers of motor operated doors, such as the door 10, are provided with an obstruction or so-called bottom edge sensor 11 or an equivalent device. False activation of these devices occurs in many door applications due to the requirement for fine adjustment of the door closed position, heaving, or subsiding of the garage floor 13, snow or ice accumulation or similar obstructions which interfere with proper operation of the door in the door closed position. Accordingly, controllers for certain door operators often include a door closed position limit switch with multiple sets of electrical contacts or a third mechanical type switch which is activated at a door position just prior to the fully closed position, which activation signal is used to disable the signal from the edge sensor or obstruction detector 11 so that when the door is within about one to two inches of the closed position, the operator controller will only respond to a signal from the door closed limit switch.

The operating characteristics of the optical switches, such as the switches 58 and 60 of the present invention, may be used to provide a signal indicating that the door 10 is approaching a limit position. For example, assuming that the optical switch 60 senses when the door 10 has moved toward the closed position, the shield 52*a* will move, just prior to the door fully closed position, into a position which will begin to partially block the radiation beam emitted from the LED 66, thereby causing a change in the output signal from the corresponding phototransistor 68. In other words, a linearly changing voltage signal is provided to the micro-controller 80 via the conductor or circuit 70 and converter 72 which is linear in relation to the position of the shield 52*a* as it moves into a position, eventually, completely blocking the transmission of energy from the emitter or LED to the sensor or phototransistor. This linearly variable voltage signal may be used to provide a signal to the micro-controller 80 to ignore any signal from the obstruction detector 11 just prior to the micro-controller receiving the full voltage signal from the optical switch 60 indicating that the door is fully closed. Alternatively, the motor 30 may be commanded by controller 80 to continue running for a predetermined period of time beginning with the initial change in output signal from phototransistor 68. In this way, the control unit 43 of the present invention, including the optical switch 60, may provide a dual function, that is, disabling the obstruction sensor or edge detector and also functioning as the door closed limit switch. Still further, an additional opto interrupter may be disposed such that the opto interrupter or optical switch 60 causes the controller 80 to ignore the signal from sensor 11 and the additional opto interrupter would provide a signal to shutoff motor 30.

Accordingly, output signals from the optical switches 58 and 60, particularly the switch 60, may be monitored by the micro-controller 80 by way of the converters 72 and 74 in a linear mode rather than reading signals output from the respective switches directly as digital signals. In other words the circuit of control unit 43 may take digital signals from optical switches 58 and 60 to the microcontroller 80 directly or by way of the converters 72 and 74. In this way, a higher degree of resolution may be used to cause the switch 60 to also function as a so-called pre-limit switch. In this way the micro-controller 80 may then ignore any signal from the edge or obstruction sensor 11 to allow the motor 30 to keep operating until the fully closed position of the door is obtained which may be determined by the level of output signal from the switch 60 or by operating the motor 30 for a predetermined period of time after a signal is generated by optical switch 60.

The operation of the control unit 43 and the operator 14 is believed to be readily understandable to those skilled in the art based on the foregoing description. The positions of the nut members 50 and 52 may, of course, be adjusted in corresponding relation to the open and closed positions of the door 10 in a known manner. Resolution of the door closed position with shut-off of the operator motor may be correspondingly adjusted by determining the pitch of the threads 41 and the corresponding threads on the nut members 50 and 52. Alternatively, if a higher degree of resolution is required than can be obtained by thread pitch change, screw member 40 may, as previously discussed, be separately driven through a drive mechanism which will provide the requisite resolution. The optical shield members 50*a* and 52*a* may take a different configuration than that shown, as well as the nut members 50 and 52. Also, the sensors 68 may take other forms, such as photodarlington transistors, photodiodes or photodiode/amplifiers. Phototransistors, as described, will function suitably in accordance with the needs of the invention.

The so-called opto interrupter type limit switches 58 and 60 are advantageously mountable on circuit board 44 thus eliminating the requirement to mount mechanical snap-action types switches to a chassis or other support means via mechanical fasteners and associated wiring harnesses. Accordingly, less labor and other manufacturing costs are experienced with the provision of a circuit board mounted set of optical type limit switches in accordance with the invention. The separate analog-to-digital converters shown in the schematic of FIG. 5 may not be required depending on the capabilities of the micro-controller. For example, the micro-controller 80 may be configured to accomplish the analog-to-digital conversion internally and the monitoring of a linear voltage signal from the optical switches may be carried out by the micro-controller 80 and these signals compensated by internal programming of the micro-controller in accordance with signals received from temperature sensor 82. The temperature sensor 82 may not be required to be mounted on circuit board 44, although this is advantageous. Depending on the locations of the respective optical switches 58 and 60, a temperature sensor located in close proximity to both switches may be desirable.

Referring now to FIGS. 6 through 8, another preferred embodiment of a controller with optical limit switches is illustrated. As shown in FIG. 6, a modified housing 42*a* may be mounted on frame 16 in a position adjacent to shaft 36 and adapted to support a modified rotatable screw member 40*a* also in spaced apart bearings 45 and 47. Screw member 40*a* includes an extension part 40*b* which is adapted to support drive mechanism 90, such as gearing, a chain drive or a cog belt whereby screw shaft member 40*a* is driven in direct timed relation with the rotation of shaft 36.

The embodiment illustrated in FIGS. 6 through 8 is characterized by spaced apart adjustable traveling nut assemblies 92 and 94, see FIG. 6. Each nut assembly 92 and 94 includes a threaded nut member 93 and 95, respectively, threadedly engaged with a threaded portion 40*c* of rotatable shaft or screw member 40*a* and operable to travel in opposite directions in response to rotation of the shaft in a known manner. Each nut member 93 and 95 is characterized by a circular disc part 93*a* and 95*a* which is provided with circumferentially spaced radially projecting slots 96 and 98, respectively, see FIG. 8 also. Nut members 93 and 95 include respective hub portions 93*b* and 95*b* which are adapted to support a generally circular plate or disc shaped optical shield member 99 having a radially projecting optical shield part 100 formed thereon and an opposed radially projecting portion 102, see FIGS. 7*a* and 7*b*. Disc members 99 each include a radially projecting slot 104 formed therein. Members 99 are removably supported on the hub portions 93*b* and 95*b* of the nut assemblies 92 and 94 and are retained thereon, respectively, by removable retaining rings 106.

The embodiment of FIGS. 6 through 8 is further characterized by a movable lock member 110 comprising a right angle plate-like part having a first leg 112, FIGS. 7*a* and 7*b*, and a second leg 114 extending substantially at a right angle to the leg 112. As shown in FIG. 6, the lock member 110 is retained on housing 42*a* by spaced apart machine screw fasteners 116, see FIGS. 7*a* and 7*b* also, but is movable with respect to the fasteners 116 thanks to the coil springs 118, FIGS. 7*a* and 7*b*, which are sleeved over elongated shank portions of the respective fasteners 116 and are engageable with the leg 112. Lock member 110 includes a depending leg or flange 120 extending at right angles to the leg 114 and operable to be disposed in the slots 104 of the members 99, respectively, as shown by way of example for the nut assembly 94 in FIGS. 7*a* and 7*b*. The depending leg or flange 120 also defines spaced apart tabs or levers 121 and 123 which may be engaged by a person adjusting the position of the traveling nut assemblies 92 and 94 to move the leg 120 out of engagement with the respective nuts 93 and 95 while remaining engaged with the circular disc members 99, respectively.

Accordingly, the traveling nut assemblies 92 and 94 may be adjusted as to their working positions along shaft 40*a* by rotating the lock member 110 from the position shown in FIG. 7*a* to the position shown in FIG. 7*b*. In this way either or both of the nut assemblies 92 and 94 may be adjusted as to their positions along the screw shaft member 40*a* while the lock members 110 remain engaged with the disclike shield members 99 so that they maintain their position whereby the optical shield parts 100 may move through the slots 64 formed in the respective optical switches 58 and 60. Accordingly, the respective nut members 93 and 95 may be rotated to adjust their respective axial positions on shaft or screw member 40*a* for a given position of a door connected to the door operator without requiring rotation of the members 99. The operation of the embodiment described above and shown in drawing FIGS. 6 through 8 is believed to be readily understandable to one of skill in the art based on the foregoing description.

Referring now to FIGS. 9 and 10, another preferred embodiment of the invention is illustrated wherein traveling nut members 93 and 95 are mounted on shaft or screw member 40*a* and are engageable by a lock member 110*a*, similar to lock member 110 and mounted on housing 42*a* in substantially the same manner as lock member 110 is mounted and so that a flange 120*a* may be disposed in the slots 96 and 98 of the respective nuts 93 and 95 to prevent rotation of these members but allow for linear translation along shaft or screw member 40*a* as it is rotated in the same manner as described above for the embodiment shown in FIGS. 6 through 8. Accordingly, lock member 110*a* can be moved into and out of engagement with the respective nut members 93 and 95 to allow for adjusting the position of these members on screw member 40*a*.

In the embodiment shown in FIGS. 9 and 10, circuit board 44 is adapted to accommodate spaced apart elongated support block members 130 which are each provided with an elongated inverted T-shaped slot 132 formed therein, see FIG. 10. Members 130 are adapted to support respective optical shield members 134 which are each provided with a somewhat T-shaped support part 136 adapted to be slidably disposed in the slots 132 of the respective support members 130. Optical shield members 134 each include respective optical shield parts 137 spaced from the support parts 136 and aligned with the respective optical switches 58 and 60, as shown in FIG. 9, for interrupting a signal between the emitter and sensor of each of the optical switches. Accordingly, optical shield members 134 may function in the same manner as the optical shield members 50*a* and 52*a* and the optical shield parts 100 of the members 99, respectively. The members 134 include transverse flanges 138, respectively, which are disposed such that they are engageable with the respective traveling nuts 93 and 95 and operate to move the optical shield parts 137 with respect to the switches 58 and 60, respectively. The optical shield members 134 are biased by respective coil springs 140 disposed in the slots 132 of the members 130 in such a way that the optical shield parts 137 are normally in a position to not interrupt signals between the emitters and sensors of the optical switches 58 and 60, respectively. However, when the traveling nuts 93 and 95 are being moved in a direction to engage the flanges 138 of the respective optical shield members 130, these members function in the same way as the traveling nuts 50 and 52 and the traveling nut assemblies 92 and 94, respectively.

Referring further to FIGS. 9 and 10, although the optical shield parts 137, as illustrated in FIG. 9, are normally configured such that they do not interrupt the beams between the emitters and sensors of the optical switches 58 and 60, respectively, the optical shield members 134 may be modified such that the optical shield parts 137 normally interrupt such beams in the so-called relaxed positions of the optical shield members 134. Accordingly, in such a configuration, as the traveling nuts 93*a* and 95*a* engage the respective optical shield members, they would move the optical shield parts 137 to a position such that the beams of the switches 58 and 60 would become uninterrupted as opposed to being interrupted when the limit positions of the door are reached. In this way, signals would be generated to effect deenergization of the operator motor at the respective limit positions of the door as a consequence of the radiation beams of the switches 58 and 60 being uninterrupted at the limit positions.

Fabrication of the respective embodiments of the invention shown and described, including the control unit 43 and an operator including a rotatable member, such as the screw members 40 or 40*a*, which rotate in timed relation to the position of the door 10, may be carried out using conventional practices, components and materials known to those skilled in the art. Although preferred embodiments of the invention have been described in detail herein, those skilled in the art will also recognize that various substitutions and modifications may be made without departing from the scope and spirit of the appended claims.

What is claimed is:

1. A motorized operator for moving a door between first and second positions, comprising:

a control unit including a movable member drivenly connected to a motor for movement in timed relation relative to the position of the door, the control unit operable to interrupt power to the motor when the door reaches the first and second positions, respectively;

a control circuit associated with the control unit including an optical switch responsive to the position of the movable member to provide a signal to the control circuit for controlling operation of the motor to arrest movement of the door at one of the first and second positions, the movable member including a rotatable screw which is rotatable in response to movement of the door and a nut member movable along said screw, an optical shield member disposed on the nut member and operable to move along said screw to effect operation of the optical switch, the optical switch including a support member and an emitter and a sensor mounted spaced apart on the support member and disposed to allow movement of the optical shield member therebetween.

2. The door operator of claim 1 wherein the optical shield member is mounted on the nut member.

3. The door operator of claim 1 wherein the optical shield member is releasably engageable with the nut member.

4. The door operator of claim 3 wherein the optical shield member is mounted on a circuit board for the control circuit.

5. The door operator of claim 1 wherein the control unit includes two optical switches mounted spaced apart on a circuit board and cooperable with respective optical shield members movable in response to movement of respective threaded members to effect operation of the controller to shut-off power to the motor when the door reaches the first and second positions, respectively.

6. The door operator of claim 5 wherein the control unit includes a micro-controller operable to receive signals from the optical switches, respectively, for effecting control of the motor to shut-off in response to such signals.

7. The door operator of claim 1 wherein the control unit includes a controller responsive to a signal from the optical switch indicating a position of the door in proximity to the first position for operating the motor for a predetermined period of time to move the door to the first position.

8. The door operator of claim 1 further comprising a temperature sensor for sensing the ambient temperature in proximity to the optical switch to provide a compensating signal associated with a signal output from the optical switch to compensate for variations in ambient temperature affecting signals from the optical switch.

9. A motorized operator for moving a barrier between open and closed positions, comprising:

a control unit including a rotatable screw which is rotatable in timed relation to the position of the barrier and two spaced apart nut members movable along said screw;

two optical shield members each disposed on one of said respective nut member and movable along said screw, the control unit being operably connected to a motor for moving the barrier between the open and closed positions and for interrupting power to the motor when the barrier reaches the open and closed positions, respectively;

a controller associated with said control unit;

two spaced apart optical switches responsive to movement of the optical shield members to provide signals to the controller for controlling operation of the motor to arrest movement of the barrier at the open and closed positions, respectively, the optical shield members providing switch output signals when the shield members reach respective limit positions corresponding to the open and closed positions of the barrier, the optical switches each including a support member and an emitter and a sensor mounted spaced apart on the support member and disposed to allow movement of one of the optical shield members therebetween.

10. The operator of claim 9 wherein the control unit includes a micro-controller operable to receive signals from the optical switches, respectively, for effecting control of the motor to shut-off in response to such signals.

11. The operator of claim 9 further comprising a barrier edge sensor operable to provide a signal to the control unit to cause at least one of stopping and reversal of the motor, and one of the optical switches is operable to provide a signal to the control unit to ignore the signal from said edge sensor when said barrier has reached a predetermined position with respect to a closed limit position of the barrier.

12. The operator of claim 9 further comprising a temperature sensor for sensing the ambient temperature in proximity to the optical switches to provide a compensating signal associated with signal outputs from the optical switches to compensate for variations in ambient temperature.

* * * * *